US011070639B2

(12) United States Patent
Kim et al.

(10) Patent No.: US 11,070,639 B2
(45) Date of Patent: Jul. 20, 2021

(54) NETWORK INFRASTRUCTURE SYSTEM AND METHOD FOR DATA PROCESSING AND DATA SHARING USING THE SAME

(71) Applicant: ELECTRONICS AND TELECOMMUNICATIONS RESEARCH INSTITUTE, Daejeon (KR)

(72) Inventors: Sun Me Kim, Daejeon (KR); Nam Seok Ko, Daejeon (KR); Sang Ki Kim, Daejeon (KR); Sung Hyuk Byun, Daejeon (KR); Dong Il Seo, Daejeon (KR); Jea Hoon Yu, Daejeon (KR); Tae Whan Yoo, Daejeon (KR); Seung Hyun Yoon, Daejeon (KR); Sang Ho Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 307 days.

(21) Appl. No.: 16/131,172

(22) Filed: Sep. 14, 2018

(65) Prior Publication Data

US 2019/0098104 A1 Mar. 28, 2019

(30) Foreign Application Priority Data

Sep. 28, 2017 (KR) .......................... 10-2017-0126127
Aug. 20, 2018 (KR) .......................... 10-2018-0096917

(51) Int. Cl.
*H04L 29/08* (2006.01)
*H04L 12/46* (2006.01)

(52) U.S. Cl.
CPC ...... *H04L 67/2809* (2013.01); *H04L 12/4641* (2013.01); *H04L 67/1097* (2013.01); *H04L 67/12* (2013.01)

(58) Field of Classification Search
CPC ...... H04L 67/2809; H04L 67/12; H04L 67/16
See application file for complete search history.

(56) References Cited

U.S. PATENT DOCUMENTS 10,262,019 B1 * 4/2019 Reiner .................. G06F 9/5077
10,462,212 B2 * 10/2019 Amento ............. H04L 41/5041
(Continued)

FOREIGN PATENT DOCUMENTS

| KR | 10-1383027 B1 | 4/2014 |
| KR | 10-1756709 B1 | 7/2017 |
| WO | 2017/035536 A1 | 3/2017 |

OTHER PUBLICATIONS

"Data Districution Service (DDS)", Version 1.4, Object Management Group, Apr. 2015.
(Continued)

*Primary Examiner* — Philip C Lee
(74) *Attorney, Agent, or Firm* — LRK Patent Law Firm

(57) ABSTRACT

A network infrastructure system implements data sharing and processing by using a network infrastructure to which an application terminal or application server constituting an application domain is connected in a shared manner, includes a plurality of network infrastructure nodes storing, processing, sharing data, wherein each of the plurality of network infrastructure nodes includes a data processing module including a data transfer function, a data distribution function, a data processing function, and a data sharing function which are provided to at least one of the application terminal and the application server.

18 Claims, 13 Drawing Sheets

(56) References Cited

U.S. PATENT DOCUMENTS

| | | | |
|---|---|---|---|
| 2011/0153958 A1 | 6/2011 | Lee et al. | |
| 2013/0212214 A1* | 8/2013 | Lawson | H04L 67/306 |
| | | | 709/217 |
| 2013/0311558 A1 | 11/2013 | Kim et al. | |
| 2015/0007169 A1* | 1/2015 | Li | H04L 67/10 |
| | | | 717/177 |
| 2015/0253994 A1* | 9/2015 | Takada | G06F 12/109 |
| | | | 711/118 |
| 2015/0261782 A1* | 9/2015 | McFerrin | G06F 16/178 |
| | | | 707/625 |
| 2017/0201585 A1* | 7/2017 | Doraiswamy | H04L 67/34 |
| 2017/0244601 A1* | 8/2017 | Byers | H04L 43/0817 |
| 2017/0293501 A1* | 10/2017 | Barapatre | G06F 9/45558 |
| 2018/0234351 A1* | 8/2018 | Amento | G06F 9/00 |
| 2018/0270121 A1* | 9/2018 | Stringfellow | H04L 41/142 |
| 2018/0300124 A1* | 10/2018 | Malladi | G06F 9/542 |
| 2018/0316555 A1* | 11/2018 | Salgueiro | G06N 20/00 |
| 2019/0098073 A1* | 3/2019 | Modai | G06F 8/60 |

OTHER PUBLICATIONS

Boris Otto et al., "Industrial Data Space Digital Sovereignity Over Data", Fraunhofer-Gesellschaft, Munchen 2016.

\* cited by examiner t:time, N:# of network hop, v:volume, M:# of creator t:time, N:# of network hop, v:volume, M:# of creator, F:Filter degree

NETWORK INFRASTRUCTURE SYSTEM AND METHOD FOR DATA PROCESSING AND DATA SHARING USING THE SAME

CROSS REFERENCE TO RELATED APPLICATIONS

The present application claims priority to Korean Patent Application Nos. 10-2017-0126127, filed Sep. 28, 2017, and 10-2018-0096917, filed Aug. 20, 2018, the entire contents of which are incorporated herein for all purposes by this reference.

BACKGROUND OF THE INVENTION

1. Field of the Invention

The present invention relates generally to a network infrastructure system and a network infrastructure node constituting the network infrastructure system. In addition, the present invention relates to a method of data sharing and processing data efficiently by using the network infrastructure system.

2. Description of Related Art

A hyper-connected society based on IoT creates intelligence by analyzing a large amount of collected data, and by fusing data across industrial boundaries, it is expected that the society will develop new high value-added industries and services. Accordingly, each industry sector has dedicated much time and expense for collecting various data and for highest quality data, intelligent high value added services/products have been created through data analysis/processing.

However, a conventional data collection is performed in a closed manner as an individual platform for each industry sector, and the collected data is mainly used within its own domain. Accordingly, sharing with other industries, and real-time online transactions of the collected data are difficult.

In addition, when processing and using data, data created by an industry field, a personal terminal, etc. is connected in an individual collection platform of a remote cloud or a remote application site, and the data is controlled and provided as a remote service ager performing data filtering and big data analysis for the same. The above process is called a "cloud computing system". However, in a conventional cloud computing system, a processing latency occurs due to data transmission latency and data overload occurs as an amount of data to be processed remarkably increases.

Accordingly, data conventionally collected may be mainly used for non-real time services such as analysis and prediction services, etc. Therefore, providing services for future society such as ultra-intelligence services requiring a fast control at a field by performing real-time analysis such as self-driving or unmanned factory, and ultra-realistic services such as augmented reality/virtual reality (AR/VR) technology may be limited.

Related to the same, in order to solve the above problems of the cloud computing system, recently, a network service for rapidly processing data nearby an area where the data is generated rather than a cloud area has been developed, and this is called a "fog computing system". Related to the same, a conventional fog computing system is suitable for application that reduces data transmission latency which uses a computing resource of an access terminal, but is limited in satisfying requirements of various applications other than latency (network resource, computing resource, mobility, data sharing, etc.) and improving network efficiency.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to provide a new network infrastructure system and a new data processing method for data sharing and service optimization.

In addition, in order to solve the above problems occurring in the related art, another object of the present invention is to provide a network infrastructure system being capable of processing data according to various requirements of an application service by using a plurality of network nodes constituting a network infrastructure, and a method of data sharing and data processing using the same.

In addition, in order to solve the above problems occurring in the related art, still another object of the present invention is to provide at least one of a data transfer function (or data oriented transfer function), an event-driven data distribution function, a data processing function, an infrastructure resource management function, a data sharing and managing function and an optimization engine function by each network node constituting a network infrastructure.

In addition, still another object of the present invention is to provide a network infrastructure system and a data processing method, wherein, for data-based service and industrial development, applications share and exchange data in real-time (for example, one-to-one, or N-to-M) over own domains by using a data market place based on a network infrastructure, and requirements of optimized ultra-realistic and ultra-intelligence application services (KPI, key performance index) is satisfied by providing application data and application software dynamically or in an on-demand manner at an optimized area within a network infrastructure according to requirement of an application service.

Technical problems obtainable from the present disclosure are not limited by the above-mentioned technical problems, and other unmentioned technical problems may be clearly understood from the following description by those having ordinary skill in the technical field to which the present disclosure pertains.

In order to achieve the above object, according to one aspect of the present invention, there is provided a network infrastructure system, wherein the network infrastructure system implements sharing and processing data by using a network infrastructure to which an application terminal or application server constituting an application domain is connected in a shared manner, the system including: a plurality of network infrastructure nodes storing, processing, and sharing data within the network infrastructure system, wherein each of the plurality of network infrastructure nodes includes a data processing module including a data transfer function, a data distribution function, a data processing function, and a data sharing function which are provided to at least one of the application terminal and the application server.

In addition, each of the plurality of network infrastructure nodes may correspond to any one of a network configuration node including an access network node, an edge network node, and a core network node which constitute the network infrastructure system, and each network infrastructure node may further include an application data repository and an application software repository.

In addition, the data transfer function may be an interface through which all application terminals or application servers within the application domain are connected to a network, and transfer data between a transmitter and a receiver based on a name of application data and application software in a request/response manner.

In addition, the data transfer function may transfer data by performing synchronization based on a name of the data in a one-to-one request/response manner.

In addition, when application data is asynchronously transferred in an event-driven manner between N data generators and M data consumers, the N data generators that want to share data may publish the data based on a name of the same in the network infrastructure by using the data distribution function, and the M data consumers that want to consume data may transmit a subscription request for desired data in the network infrastructure based on a name of the data by using the data distribution function.

In addition, the data distribution function may store and manage a list of receivers that will receive the shared data and criterion information by receiving the published data and the subscription request, and distribute the shared data to the M data consumers that has transmitted the subscription request in an event-driven manner without requiring an additional request by using the receiver list and the criterion information when the data is published.

In addition, the data distribution function may dynamically determine a storage position and a distribution position of data to be distributed according to a temporal sharing feature and a spatial sharing feature of the data, and a distribution situation of a data generator and a data consumer, and adjust the storage position and the distribution position of the data according to changes in position of the data generator and the data consumer.

In addition, the data distribution function may publish, in addition to raw data generated in the application terminal or application server of all application domains connected to the network, processing data that is regenerated by the application software executed in the network infrastructure node within the network infrastructure, and wherein application software executed in the network infrastructure node within the network infrastructure may receive arbitrary data as a data consumer by transmitting a subscription request for the same.

In addition, the data processing function may receive a service request based on a name of application data and application software information from the application terminal or application server, determine an optimized execution position of the application software, dynamically download the application data and the application software required for processing the service, and execute the downloaded application software.

In addition, the application data designated base on the name may be transferred from the application terminal or application server according to the service request, or stored in an arbitrary repository within the network infrastructure, and the application software designated base on the name may be stored in an arbitrary repository within the network infrastructure in advance by an application, executed by being dynamically downloaded in an optimized execution position within the network infrastructure when an execution of the application software is received by the data processing function, and transfer a result of the execution to the application terminal or application server.

In addition, the optimized execution position of the application software may be determined according to a feature of the corresponding application software, wherein as the optimized execution position, a network node positioned closest to data may be determined when an amount of data to be processed is large, a network node positioned close to a position of the application terminal may be determined when a fast processing response to the application terminal is required, a network node possessing a computing resource capable of satisfying a corresponding request may be determined when an large amount of the computing resource is required, and a network node using the best optimized network may be determined when data to be processed is distributed into various positions such that requirement (KPI) of the application software is satisfied.

In addition, the data processing function may: determine the execution position of the application software that the execution request for the same has been transmitted from the application terminal or application server based on the name of the application; download the application data from the application domain or from a network internal storage position when the name of the application data designated from the corresponding application terminal or application server has been transmitted together, and execute the application software by binding the application data; and transfer a result of the execution to the application terminal or application server.

In addition, each of the plurality of network infrastructure nodes may further include an infrastructure resource management function, wherein the infrastructure resource management function may: integrally manage a computing resource, a storage resource, and a network resource of the plurality of network infrastructure nodes distributed within the network infrastructure system; store application data within the network infrastructure system without a command or control of an operator by distributing the same by performing auto-scaling of increase, decrease, and error in the resource; and provide an computing environment where the application software is executed.

In addition, each of the plurality of network infrastructure nodes may further include a data security function, wherein the data security function may manage and provide an encryption key for data sharing between the application domains connected through the network infrastructure, and for data exchanging between an approved data generator and a data consumer.

In addition, the data sharing function may store and manage an exchanging record for integrity verification of data exchange between the approved data generator and the consumer.

In addition, each of the plurality of network infrastructure nodes may further include an optimization engine function: optimizing a network connection, a data storage position, a software execution position so as to satisfy application service requirement (KPI); determining an initial position of application data and application software based on a profile of the same; and performing optimization for the storage position and the execution position based on an access frequency of the application data, a network transmission amount, and statistical and record information of execution quality of the application software.

In addition, each of the plurality of network infrastructure nodes may further include an optimization engine function performing optimization by performing learning using the data distribution function between a data generator and a data consumer according to changes in number and in position of N data generators and M data consumers.

In addition, the system may further include a cloud node as a network node constituting the network infrastructure system, wherein the cloud node may be regarded as one network infrastructure node having a computing resource and a storage resource relatively larger than other network infrastructure nodes.

In addition, according to the present invention, a method of processing data within a network infrastructure system, wherein the network infrastructure system includes a plurality of network infrastructure nodes processing data by using a network infrastructure to which an application terminal or application server constituting an application domain is connected in shared manner, the method includes: providing an environment for storing application data and for storing and executing application software in an integrated computing resource and a storage resource, each of the plurality of network infrastructure nodes including a computing resource and a storage resource; when an execution request of application software for an application service is received from the application terminal within the application domain, searching, by any one of the plurality of network infrastructure nodes, the corresponding application software, and dynamically determining an execution position of the application software in the network infrastructure node itself or in another network infrastructure node according to a profile of the application software; and providing the application service by transferring a result obtained by executing the corresponding application software to the application terminal.

In addition, according to the present invention, a network infrastructure node, wherein a plurality of network infrastructure nodes processing data by using a network infrastructure to which an application terminal or application server constituting an application domain is connected in a shared manner is included in a network infrastructure system, the network infrastructure node includes: a data processing module storing, processing, and sharing data provided to the network infrastructure system, wherein each of the plurality of network infrastructure nodes provides a data transfer function, a data distribution function, a data processing function, and a data sharing function to at least one of the application terminal and the application server.

According to an embodiment of the present invention, the following effects are obtained by providing functions of network infrastructure-based data sharing and application service optimization.

First, data sharing efficiency can be provided. All of individuals, industries, and public institutions are connected through a network. Accordingly, rather than providing a market place in a platform of a specific application domain, by providing a market place where data sharing or storing data that may be exchanged is available by using a network infrastructure to which all application domains are connected in a shared manner, data sharing of global scope can be available by using a universal network accessing method among all application domains. In addition, data is distributed by an arbitrary node such as access network node, edge network node, core network node, cloud network node, etc. within the network infrastructure, and thus increasing the possibility of creating new value through sharing and using data with an arbitrary processing range including raw data to processed data can be available. In other words, in addition to a connectivity provided from a conventional network infrastructure, data sharing efficiency through the network infrastructure can be improved by additionally establishing data sharing and processing functions.

In other words, asynchronous event-driven multi-lateral data sharing and exchanging in a one-to-one request/response manner based on an encryption key between a data provider or generator and a data consumer and asynchronous event-driven multi-lateral data sharing and exchanging within an N-to-M group can be provided by using transfer, distribution, and sharing functions of the network infrastructure, and thus various types of intelligence can be created by providing efficient data sharing between all application domains connected to the network.

Then, application service optimization can be provided. Rather than processing data generated in the field or locally by remote application software after being collected in a remote application server, application data and application software processing of the application data are dynamically moved to and executed in an optimized position in a nation-wide range from an access node to a core node within a network according to requirements (KPI) of application services, and thus various future ultra-intelligence and ultra-realistic application services can be provided in an optimized manner according to respective requirements of the same. For example, a service requiring a fast control and ultra-low latency is processed by moving the application software to an end user where application data is generated or to an access device or node nearby the field, and thus fast control can be provided.

In addition, when an important urgent service related to security or disaster has to be immediately processed by analyzing major data when collecting big data, application software for data collection and analysis of the network infrastructure are hierarchically arranged in an access network node, an edge network node, and a core network node according to a hierarchical structure of a tree form of the network infrastructure. Accordingly, finally, by hierarchically sequentially collecting data and simultaneously analyzing the same, big data can be efficiently collected, and in addition to the fast analysis, major data can be detected in real-time and important and urgent services can be efficiently provided. In addition, data processing requiring a large processing load can be executed in a core or edge cloud center, or in a node where a computing resource is abundant.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1A:
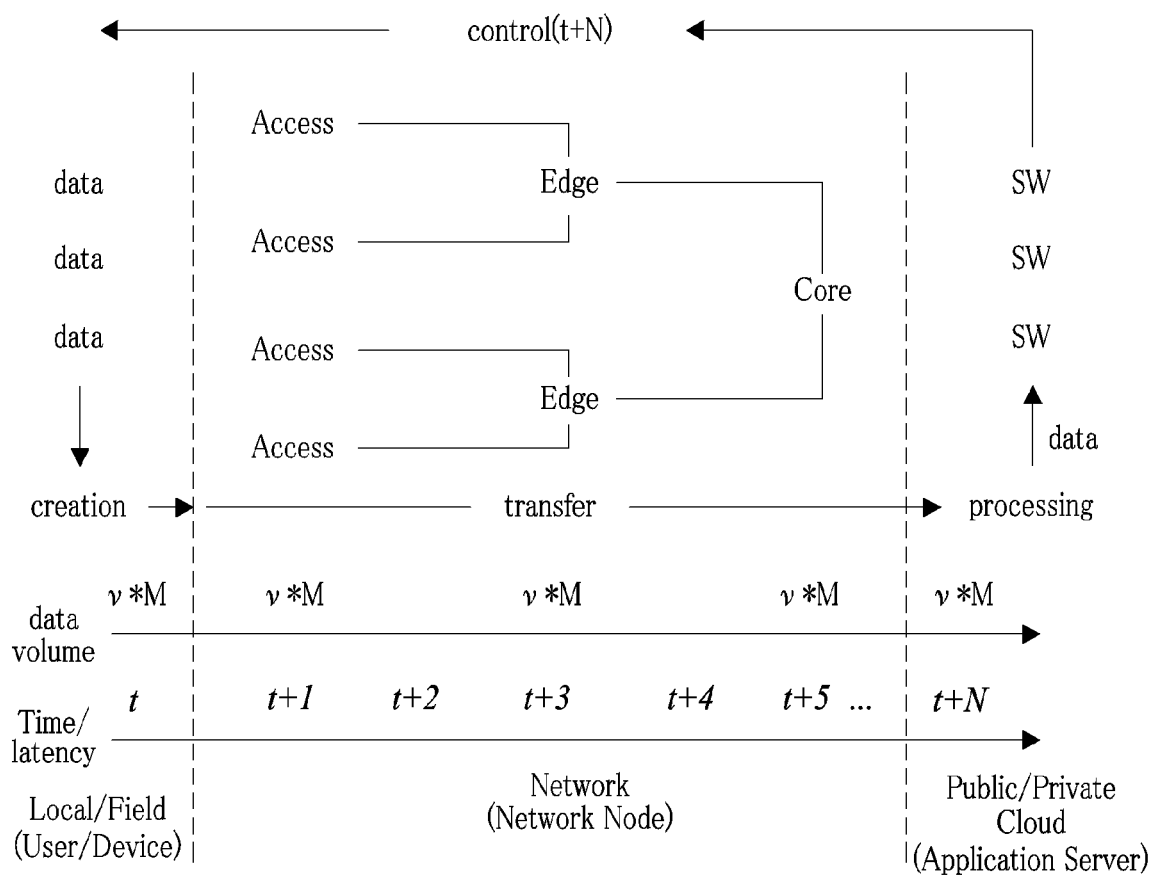
FIGS. 1A and 1B are views describing data sharing and data processing concept by using a conventional network infrastructure.

Hereinafter, an exemplary embodiment of the present invention will be described with reference to the accompanying drawings for those skilled in the art to easily implement the present invention. The size and thickness of each component shown in the drawings are arbitrarily shown for ease of the description, but the present invention is not limited thereto.

In the following description, if a detailed description about well-known functions or configurations may make the subject matter of the disclosure unclear, the detailed description will be omitted. In addition, in the drawings, parts not related to the description of the present invention are omitted, and like parts are denoted by similar reference numerals.

In the present invention, the components that are distinguished from each other are intended to clearly describe the respective features, and do not necessarily mean that the components are separated. That is, a plurality of components may be integrated into one hardware or software unit, or one component may be distributed into a plurality of hardware or software units. Accordingly, such integrated or distributed embodiments are included within the scope of the present invention, unless otherwise noted.

In the present invention, the components described in the various embodiments are not necessarily essential components, and some may be optional components. Accordingly, embodiments consisting of a subset of the components described in one embodiment are also included in the scope of the present invention. In addition, embodiments including other components in addition to the components described in the various embodiments are also included in the scope of the present invention.

Hereinafter, in order to accomplish the above objects, an embodiment of data sharing and application service optimization method and apparatus between applications based on a network infrastructure will be described in detail with reference to the accompanied drawings.

First, in the present invention "network infra" or "network infrastructure" means a fundamental communication environment of a fundamental range including a network component constituting a wireless and wired communication network. For example, a base station, an access point, etc. correspond to a network infrastructure component used for connection of a conventional communication network. Hereinafter, in the present invention, for convenience of description, the "network infrastructure structure" is disclosed as the "network infrastructure". In addition, a "network infrastructure component" or "network infrastructure component" is disclosed as a "network infrastructure node" or "network node". In addition, a state where network infrastructure nodes are connected is disclosed as a "network system" or "network infrastructure system".

Hereinafter, a conceptual difference between a method of sharing and processing data by using a network infrastructure of the present invention and a method of sharing and processing data by using a conventional network infrastructure will be described.

Figure 1B:
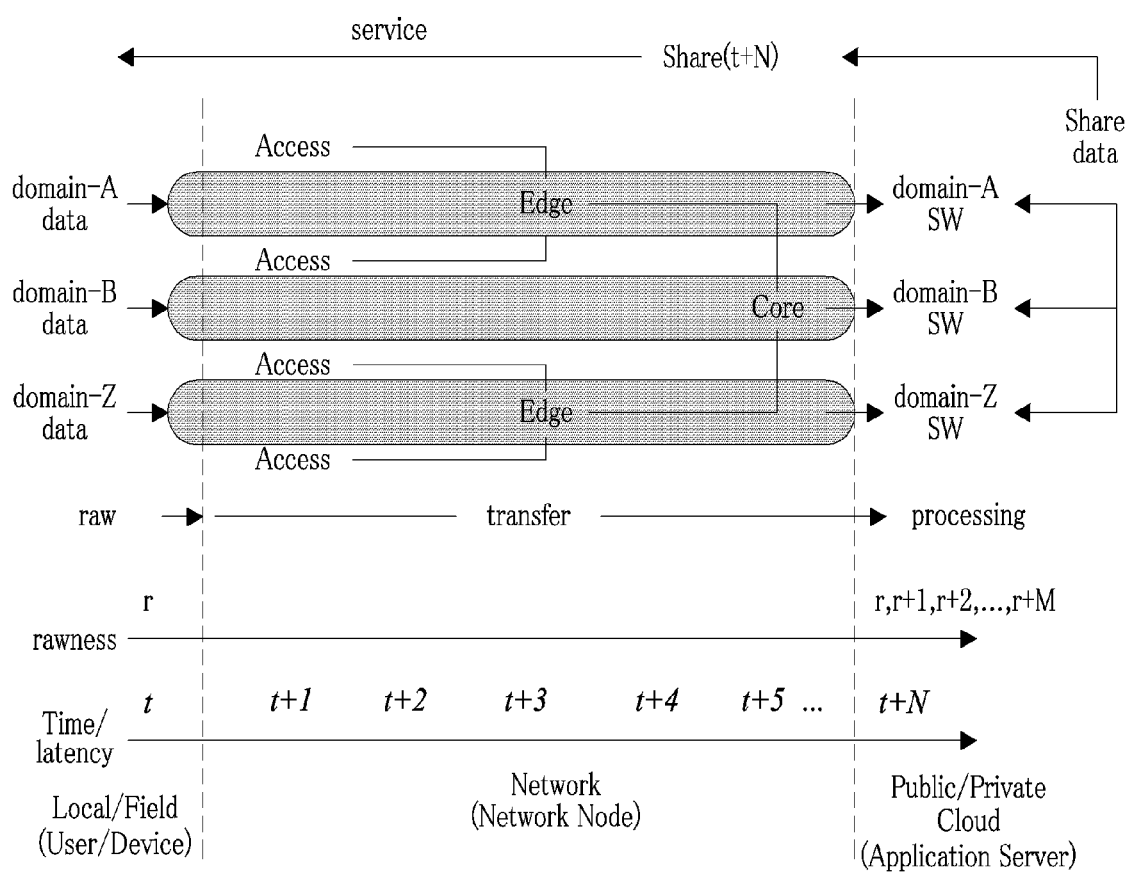
Figure 2A:
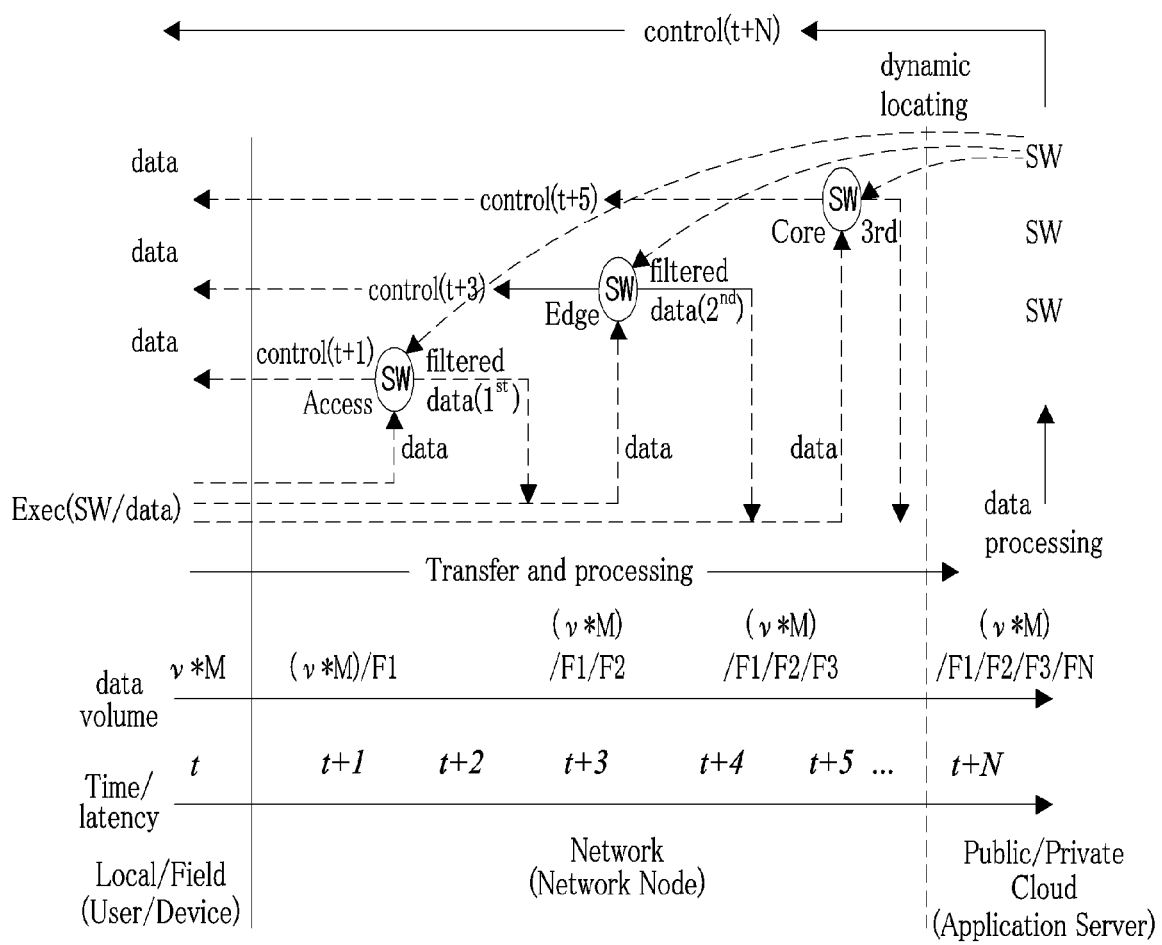
FIGS. 2A and 2B are views describing data sharing and data processing concept by using a network infrastructure of the present invention.
Figure 2B:
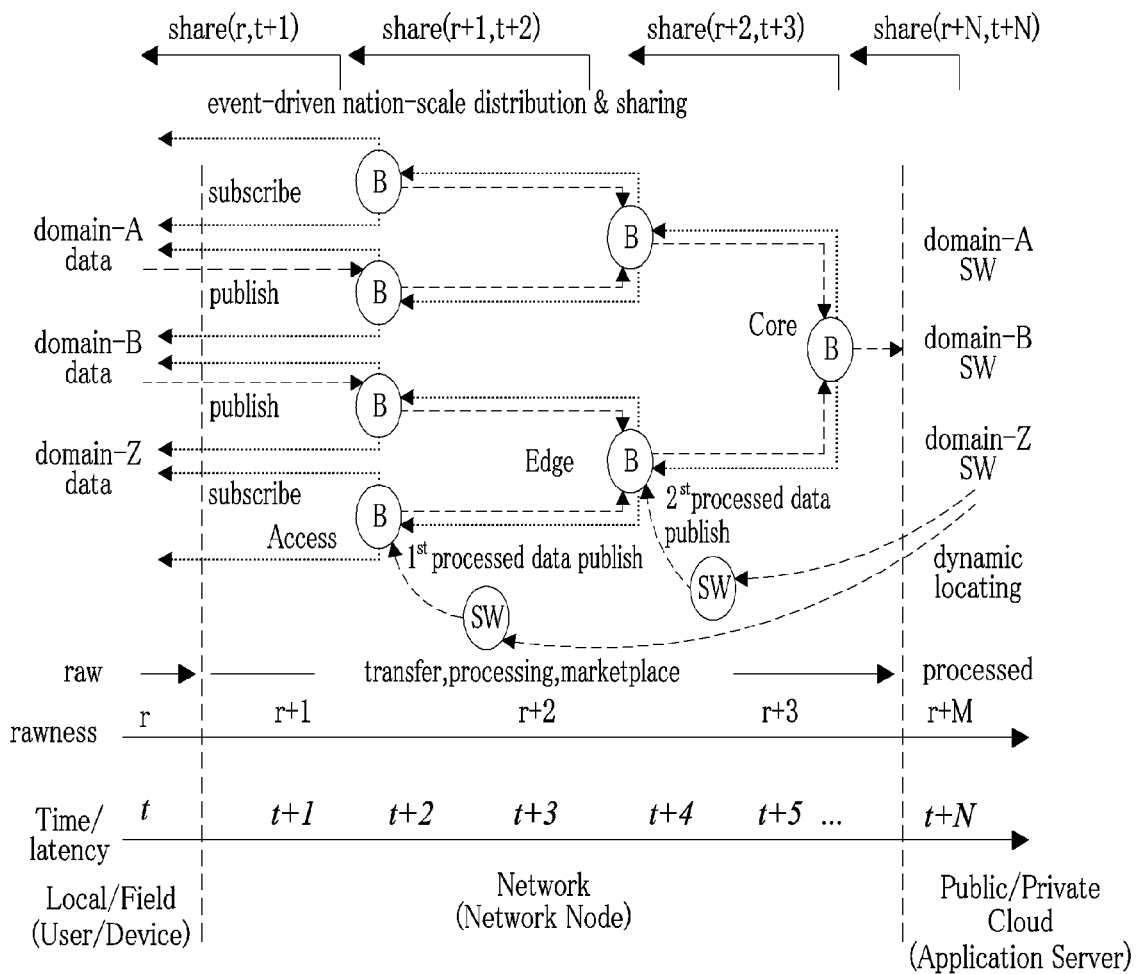

FIGS. 1A and 1B are views describing data sharing and data processing concept by using a conventional network infrastructure, and FIGS. 2A and 2B are views describing data sharing and data processing concept by using a network infrastructure of the present invention.

First, comparison of a data processing method using a network infrastructure of the present invention with a data processing method using a conventional network infrastructure will be described with reference to FIGS. 1A and 2A.

FIG. 1A is a view showing a conceptual diagram of a data processing method using a conventional network infrastructure. For example, data generated in a local site or field (for example, IoT data), is collected by a remote public cloud or an application server where software capable of processing the data is present, and transmitted thereto. The collected data is analyzed and processed remotely, and is used for remotely controlling the local site or field. Herein, in the conventional data processing method, control through the data is performed after elapsing t+N, and thus providing various present and future services requiring a fast control may be restricted. In addition, transmission of all types of data has to be performed through each network node even though the data is not required for the control, and thus consumption of a network bandwidth in each network node occurs as many as "volume*M (number of data creators).

Meanwhile, FIG. 2A is a view showing a conceptual diagram of a data processing method using a network infrastructure according to the present invention. For example, by using an application software dynamic in-network processing method according to a network infrastructure of the present invention, in addition to at a timing t, application data is collected and analyzed in an access network node and an edge network node at timings t+1, t+2, t+3, etc., and thus a fast control according to a requirement is available. In addition, data collection in a unit of a primary access node range, a secondary edge node range, and a tertiary core node range according to hierarchical architecture of a network is available, and at the same time, reduction in a network bandwidth due to a transmission of garbage data within the network is established by performing sequential filtering for the data through analysis and processing. For example, the network bandwidth may reduce from $(v*M)/F1$ to $(v*M)/F1/F2$ and $(v*M)/F1/F2/F3$ according to a filtering function. As a result, an increase in a big data processing speed of an application domain and a decrease in load may be achieved. In addition, during the above process, a major service execution is also provided by analyzing major information quickly.

Then, comparison of a data sharing method using a network infrastructure of the present invention with a data processing method using a conventional network infrastructure will be described with reference to FIGS. 1B and 2B.

FIG. 1B is a view showing a conceptual diagram of a data sharing method using a network infrastructure according to a conventional method. In detail, numerous data is intelligentized through an IoT, a cloud, AI, etc., but it is limited to an application/domain specific intelligence. In other words, a single piece of raw data may be used to create another business by using the same as another intelligence, and a current method of collecting data is performed between a terminal and a remote application platform through an Internet or leased line or a virtual private network (vpn). Accordingly, data sharing and using among application domains is available after a timing of t+N. In addition, management of processing big data to share data from raw data to M-th processed data and complexity thereof is generated.

Meanwhile, FIG. 2B is a view showing a conceptual diagram of a data sharing method using a network infrastructure according to the present invention. For example, by using a method of in-network event-driven data distribution of application data, N-to-M event-driven data sharing is available among application domains (for example, application terminal, application server, application software) which are distributed at a nation-scale. In addition, the application software within a network publishes the processed data by using a dynamic in-network processing function, and thus the raw data, the primary and the secondary processed data may be respectively shared at timings of t+1, t+3, and t+5 in an arbitrary rawness level (for example, r, r+1, r+2, r+3 r+N) and at an arbitrary timing according to application requirements. For example, at every event, data sharing is available in (r, t+1), (r+1, t+2), (r+2, t+3), and (r+N t+N).

In detail, an object of the conventional network infrastructure of FIGS. 1A and 1B is to provide data connectivity. In other words, the conventional network infrastructure performs a function of transferring data generated by a network data provider or generator to a remote application server or a cloud server.

On the other hand, the network infrastructure of the present invention includes, in addition to data connectivity, a data processing module or a data processing function. Accordingly, the network nodes within the network infrastructure system according to the present invention of FIGS. 2A and 2B respectively include a data processing module or function of storing and processing data. In addition, for the data processing, the network nodes according to the present invention may autonomously download remote application software and use the same for the data processing.

Hereinafter, a network infrastructure system and a data processing module or function of a network infrastructure node according to the present invention will be described in detail with reference to FIGS. 3 to 11.

Figure 3:
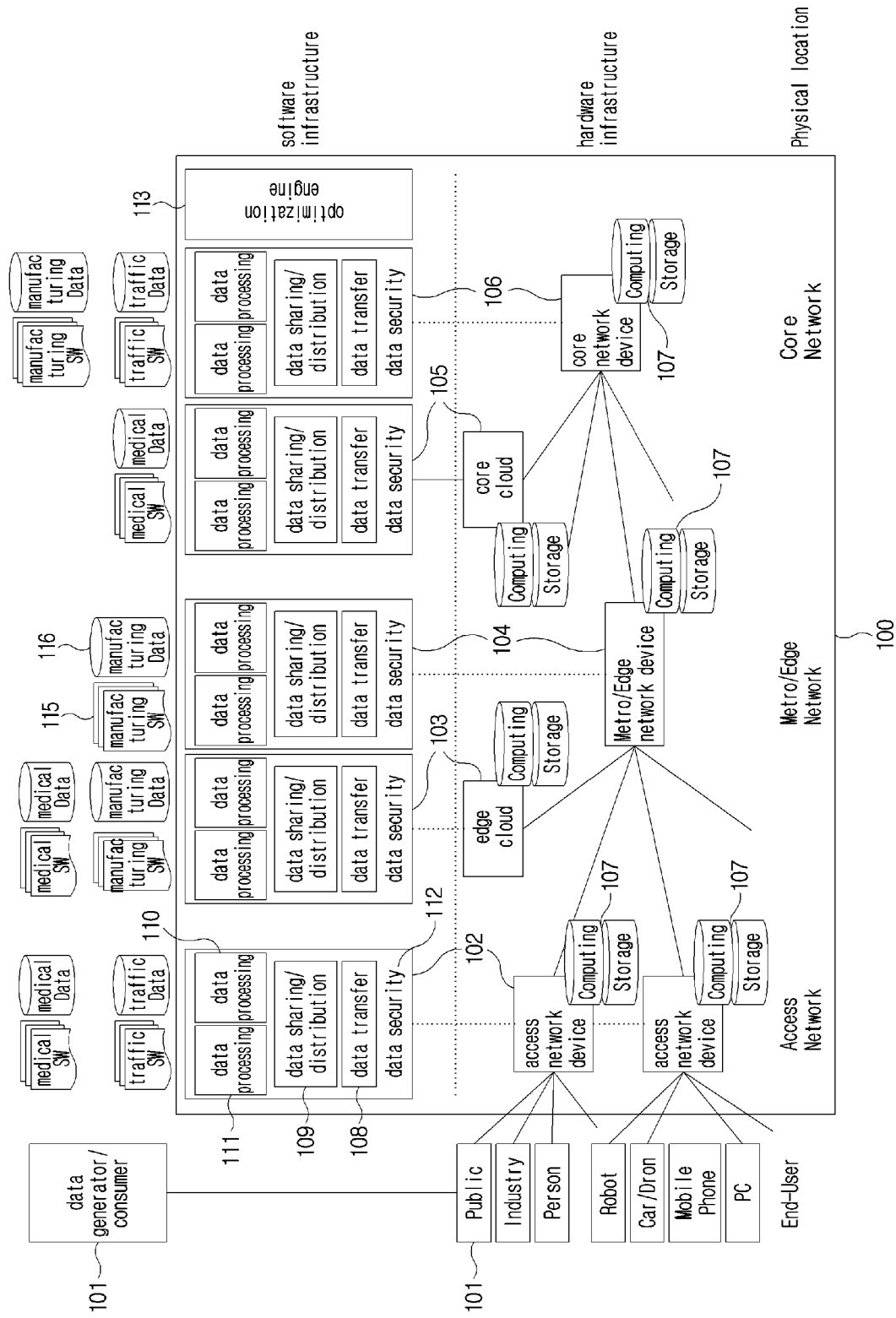
FIG. 3 is a view showing a network infrastructure configuration based on a network and a cloud of the present invention.

FIG. 3 is a view showing a network infrastructure configuration for network and cloud-based data sharing and application service optimization of the present invention.

For example, a physical infrastructure constituting a network system of the present invention may be configured with an end user 101, and an access network 102, (hereinafter, referred as "access network node" or "access node", a metro/edge network 104 (hereinafter, referred as "edge network node" or "edge node", a core network 106 (hereinafter, "core network node" or "core node"), an edge cloud 103, and a core cloud 105. Related to the same, the above network infrastructure configuration is an example for describing the present invention, and the present invention is not limited thereto. For example, respective network nodes within the network infrastructure may maintain a mutual horizontal relationship. Herein, the network nodes may be called such as first node, second node, and third node.

The end user 101 include all persons or things, and applications which generate data or consume the same such as individual, industry, public sector PCs, mobile phones, self-driving car, drones, robots, etc.

In addition, the access network node 102 is a wired or wireless network access node, and provides an interface enabling the end user 101 to connect to the network.

In addition, the edge network node 104 concentrates the access network nodes, and the core network node 106, and performs connection between the edge network nodes.

In addition, the edge 103 and the core cloud 105 mean an infrastructure network cloud node having large-scale computing and storage resources as described above.

According to the present invention, the physical infrastructure may have a hierarchical architecture concentrated from the end user 101 to the access network node 102, from the access network node to the edge network node 104, from the edge network node 104 to the core network node 106. However, the above structure is an example for describing the present invention, and the present invention is not limited thereto. For example, the respective network nodes 102, 104, and 106 within the network infrastructure may be configured in a distributed manner to maintain a mutual horizontal relationship.

The network infrastructure system according to the present invention selectively includes a computing function 107 capable of performing a conventional networking or connectivity function for all network configuration components including the end user, the access network node, the edge network node, and the core network node and of executing application software, and a storage function 107 capable of storing application data.

As a function of data sharing and application service optimization in a hardware unit having the above physical infrastructure, infrastructure software 108 to 113 is used, executed in computing/storage/network resources of distributed access/edge/core network nodes and edge/core cloud nodes, and is capable of performing, for example, a data transfer function 108, a data sharing and distributing function 109, a data storage function 110, a data processing module 111, a data security function 112, and an optimization engine function 113. Related to the same, the infrastructure software 108 to 113 may be commonly applied to each network infrastructure node, or may be selectively applied by network infrastructure node. In addition, as specific infrastructure software, for example, the optimization engine function 113 may be designed to be provided within a network node having a global function of a higher layer.

In addition, based on hardware having the above physical infrastructure and software for the above data sharing and service optimization infrastructure, application software 115 and application data 116 of various application services, for example, manufacturing, medical, traffic, etc., may be dynamically stored, and executed within the network infrastructure to provide an optimized service.

In detail, for example, in FIG. 3 described above, an exemplary case is shown where a specific access network node 102 within the network infrastructure system provides "medical" and "traffic" application services, a specific edge network node 104 provides "manufacturing" application services, a specific core network node 104 "manufacturing" and "traffic"' application services, a specific edge cloud node 103 provides "medical" and "manufacturing" application services, a specific core cloud node 105 provides "medical" application services. Accordingly, application services of the respective nodes are not limited to the above mentioned services, and various application services may be added or removed instantly and dynamically according to application requirements.

Figure 4:
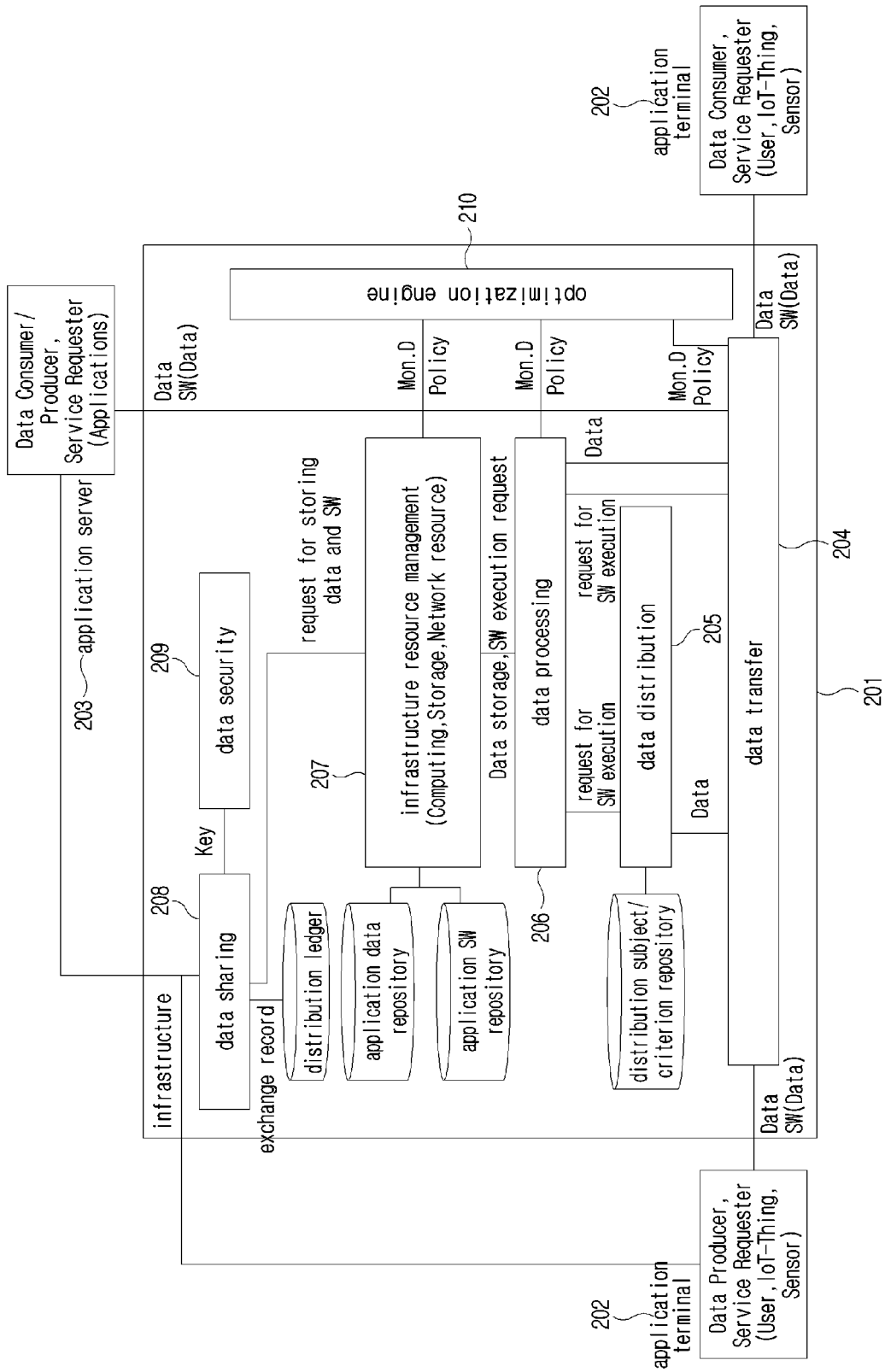
FIG. 4 is a view showing a data processing module within a network infrastructure system for a process of data sharing and service optimizing according to the present invention.

FIG. 4 is a view showing a data processing module within the data sharing and service optimization infrastructure system according to the present invention. As described above, all network nodes and cloud nodes may be equipped with corresponding software for data sharing and service optimization, and execute the same.

An application terminal 202 and an application service server 203 connected to a data sharing and service optimization infrastructure 201 function as a data generator/provider when the application terminal 202 and an application service server 203 provide services of data sharing or exchanging or as a data consumer when the application terminal 202 and the application service server 203 consume the shared data. In addition, the application terminal 202 and the application service server 203 function as service requestors 202 and 203 during service optimization, receive data required for the service through sharing and exchanging by using the data sharing and service optimization infrastructure, and receive desired application services by executing the application software.

The data sharing and service optimization infrastructure 201 according to the present invention may internally include, as a data processing module, a data transfer function 204, a data distribution function 205, a data processing function 206, an infrastructure resource management function 207, a data sharing function 208, a data security function 209, and an optimization engine function 210. Related to the same, each function may be configured with software performing a unique function. Also, each function may be configured with a hardware module performing the unique function. Herein after, each function will be described.

First, the data transfer function 204 functions as an interface such that all application terminals or application servers are connected to a network, and synchronously transfers data between a transmitter and a receiver on the basis of a name of application data and application software by using a request/response manner.

The data distribution function 205 asynchronously transfers application data in an event-driven manner between N data generators and M data consumers. The N data generators that want to share data publish the data in a network infrastructure based on a name of the data, and the M data consumers that want to consume data subscribe to desired data in the network infrastructure on the basis of a name of the data. The data distribution function 205 receives the data published and a subscription, and manages a list that will receive the shared data and a criterion. Then, when the managed data becomes published, the data distribution function 205 distributes data in an event-driven manner to the M data consumers that have transmitted a subscription by using information of the list without an additional request.

The data processing function 206 receives a service request from an application terminal or application server, dynamically downloads application data and application software required for processing the service, and executes the same in connection with the service. In detail, for example, the application data required for processing the service may be transferred from the application terminal or application server when the service request is transmitted, or may be stored in an arbitrary repository within the network infrastructure. In addition, the application software required for processing the service may be stored in an arbitrary repository of the network infrastructure in advance by an application, is dynamically downloaded, by the data processing function, in a position that is optimized for execution within the network infrastructure and executed therein when an execution request has been received, and transfers a result thereof to the application terminal or application server that has transmitted the execution request. Herein, the optimized execution position of the application software may be determined according to a feature of the corresponding software. For example, when an amount of data to be processed is large, the processing position may be close to the data, or when a fast processing response to the application terminal is required, the processing position may be close to the application terminal, or when a large amount of computing resource is required, a corresponding position satisfying the corresponding requirement may be selected, and the application software may be executed therein.

The infrastructure resource management function 207 manages in an integrated manner computing resources, storage resources, and network resources of nodes that are distributed in a network-wide such as IoT terminals, wired/wireless access/edge/core network nodes, cloud nodes, etc. In detail, by performing auto-scaling of increase, decrease, and error in resources, a computing environment is provided where data of the application is stably distributed and stored and application software is executed within the network infrastructure without a command or control of an operator. The infrastructure resource management function 207 may separately manage an application data repository and an application software repository for the above function.

The data sharing function 208 and the data security function 209 manage and provide an encryption key for recording data sharing or exchanging between application domains connected through the network infrastructure, for integrity verification and for data exchange between an approved data provider and a consumer. For the same, the data sharing function 208 may manage a distributed ledger repository for the data exchange.

The optimization engine function 210 optimizes a network connection, a data storage position, a software execution position to satisfy application service requirements (KPI). The above optimization engine function is transferred to the application software as an optimization policy. In detail, the optimization engine function 210 determines an initial position on the basis of the application data and a profile of the application software, and performs optimization by performing learning of a storage position and an execution position on the basis of statistical or record information (Mon.D, monitoring data) such as access frequency of the application data, network transmission amount, execution quality of the application software. Internal functions or modules of the data sharing and service optimization network infrastructure described above may be provided to and executed in all nodes within the network infrastructure. However, the optimization engine function 210 may be only provided to a specific node (for example, core network node) to transfer the optimization policy rather than being provided to all network nodes.

Figure 5:
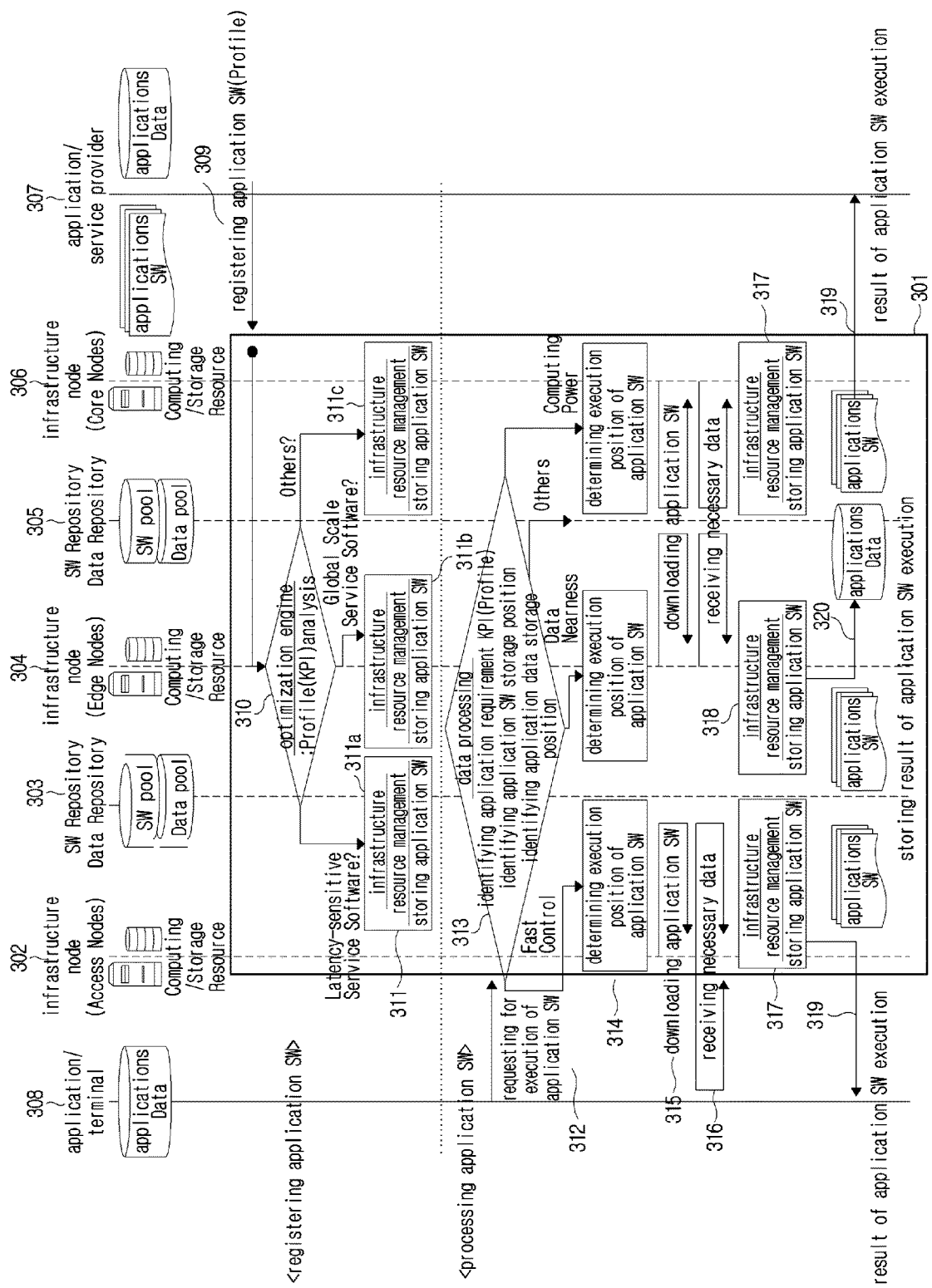
FIG. 5 is a view showing a data processing process within a network infrastructure for performing application service optimization of a network infrastructure according to the present invention.

FIG. 5 is a view showing a data processing process within the network infrastructure for performing application service optimization of the network infrastructure according to the present invention.

In detail, in a data sharing and service processing infrastructure 301, an access network node 302, an edge network node 304, and a core network node 306 are present, and the respective network nodes include, in addition to a network resource and functions, computing and storage resources and functions. In addition, repositories 303 and 305 storing application data and application software may be distributed and positioned in the network nodes or cloud nodes to be uniformly accessed within the network infrastructure.

Related to the same, a service processing example of FIG. 5 is an example showing a process where a service of a application service provider 307 is provided to an application terminal 308 through the infrastructure 301, and shows a processing process that may be executed in an arbitrary infrastructure node where the application service provider or application terminal is connected. The detail will be described below.

First, in 309, the application service provider 307 registers application software within the network infrastructure in a name of the corresponding application software.

In 310, an arbitrary network node within the network infrastructure in which the application software has been registered, analyzes a profile of the application software and service requirements (KPI) through the optimization engine function 210 described above, and in 311, the arbitrary network node determines an initial storage position of the application software within the infrastructure which is expected to have the best efficiency according to ultra-low latency requirement, requirement of a service request position, and other requirement, and stores therein. For example, a feature of the application software to be stored is classified by latency sensitive software 311a, global scale service software 311b, and other software 311c, etc., and stored in an optimized position within the network infrastructure which is suitable for each feature of application software.

Then, in 312, when an execution request of the corresponding software is received in the network infrastructure from an application terminal requesting for a corresponding application service at an arbitrary time, in 313, an arbitrary network node within the network infrastructure which has received the execution request identifies a profile of the corresponding application software and service requirement (KPI) through the data processing function 206 described above, and identifies a storage position of the application software and a storage position of application data required for the execution of the application software.

When the storage position of the application data is identified in 313, in 314, a real-time control service such as fast control determines an execution position of each application software to a position close to the terminal that has requested the service, a position close to the application data when a bandwidth of the data is large, or to a position where computing resource cost is low such as cloud when large computing power is required.

When the execution position of the application software is determined in 314, in 315, the data processing module positioned at the corresponding execution position dynamically downloads the application software required for the service and stored within the network infrastructure to the corresponding execution position in an on-demand manner, and in 316, dynamically or in an on-demand manner receives application data required for the service.

Then, in 317 and 318, a request for execution of the corresponding application software is transmitted to the infrastructure resource management function 207 described above. In 319, a result of the application software executed within the network infrastructure is immediately transmitted to the application terminal 308 or the application service provider 307 which has requested the service, or in 320, the result may be stored in a specific repository within the network infrastructure and may become a search subject or used by another application software.

Figure 6:
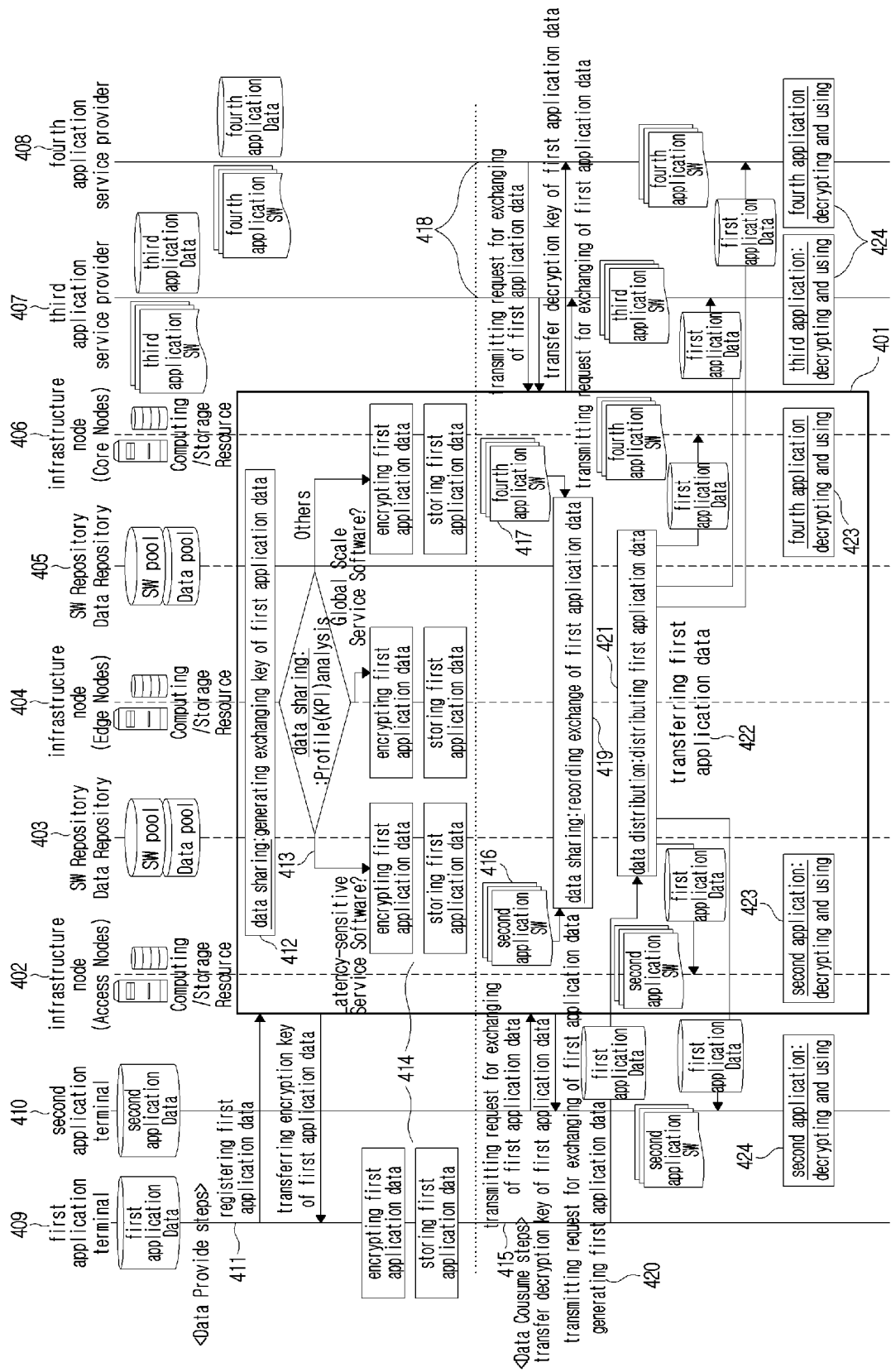
FIG. 6 is a view showing a processing process within a network infrastructure for one-to-one data sharing and exchanging between application services of a network infrastructure according to the present invention.

FIG. 6 is a view showing a processing process within a network infrastructure for one-to-one data sharing and exchanging between application services of a network infrastructure 401 according to the present invention.

In the data sharing and service processing infrastructure 401, an access network node 402, an edge network node 404, and a core network node 406 are present, and each of the network nodes includes, in addition to a network resource and functions, computing and storage resources and processing functions. In addition, repositories 403 and 405 storing application data and application software may be distributed and positioned in the network nodes or cloud nodes to be uniformly accessed within the network infrastructure. For example, a data sharing or exchanging processing example of FIG. 6 shows a process of data sharing or exchanging by one-to-one data request between a service of a first application 409 and services of a second application 410, a third application 407, and a fourth application 408.

In 411, a terminal of the first application 409 of a first application domain or a server provides data to be shared to the network infrastructure in a name of the data and a profile representing a feature of the data. The data sharing function 208 described above of the network infrastructure transfers an encryption key used for encrypting the corresponding data to the first application terminal 409 that is a data provider.

In addition, in 412, the data sharing function 208 of the network infrastructure determines a position where corresponding data is to be stored by analyzing the profile received from the provider of the corresponding data. In other words, the position may be determined in consideration of a feature of each profile, for example, service data that is sensitive in latency may be stored close to an access network node, data that is valued in a specific region may be stored in the corresponding region, data that will be used in nation-wide may be stored in the entire access network node or core network node, or a large amount of data or data processed in non real-time may be stored in a central cloud node. In addition, in 413, the stored data may be encrypted and stored by using the encryption key provided to the data provider.

Then, when a request for exchanging or sharing data provided from the first application is transmitted from any one or the entire of software 416 of the second application domain and software 417 of the fourth application domain which are being executed in at least one of a terminal 410 of the second application domain, a server of a third application domain 407 and a server of an fourth application domain 408 or within the network infrastructure, in 419, the data sharing function 208 described above of the network infrastructure records a relation between the first application terminal for the first application data and the second application terminal, the third application server, and the fourth application server, and in 414, transfers a decryption key of the first application data to applications that have requested the corresponding data.

In detail, for example, when a terminal of a second application 410 transmits a request for data to the network infrastructure in the name of first application data, the data transfer function 204 described above of the network infrastructure transfers encrypted data of the corresponding first application. In 416, the data of the first application may be stored in an arbitrary repository by the data distribution function 205 described above within the network infrastructure, or the terminal of the first application or the server may possess the data. In addition, the second application software 416 and the fourth application software 417 requesting for the data refer to software being executed in an arbitrary execution position within the network infrastructure, and thus the second application software 416 and the fourth application software 417 may respectively transmit a request for sharing the first application data at an arbitrary time. In all of the above cases, by a transfer function based on a data name of the network infrastructure, encrypted data may be transferred between the data provider (first application) and the data consumer (second application, third application, fourth application) in one-to-one request/response manner.

Then, in 423 and 424, the terminal of the second application 410, the server of the third application 407, the server of the fourth application 408, or the software 416 of the second application and the software 417 of the fourth application being executed in the network infrastructure which have received the data decrypt and use the same.

Figure 7:
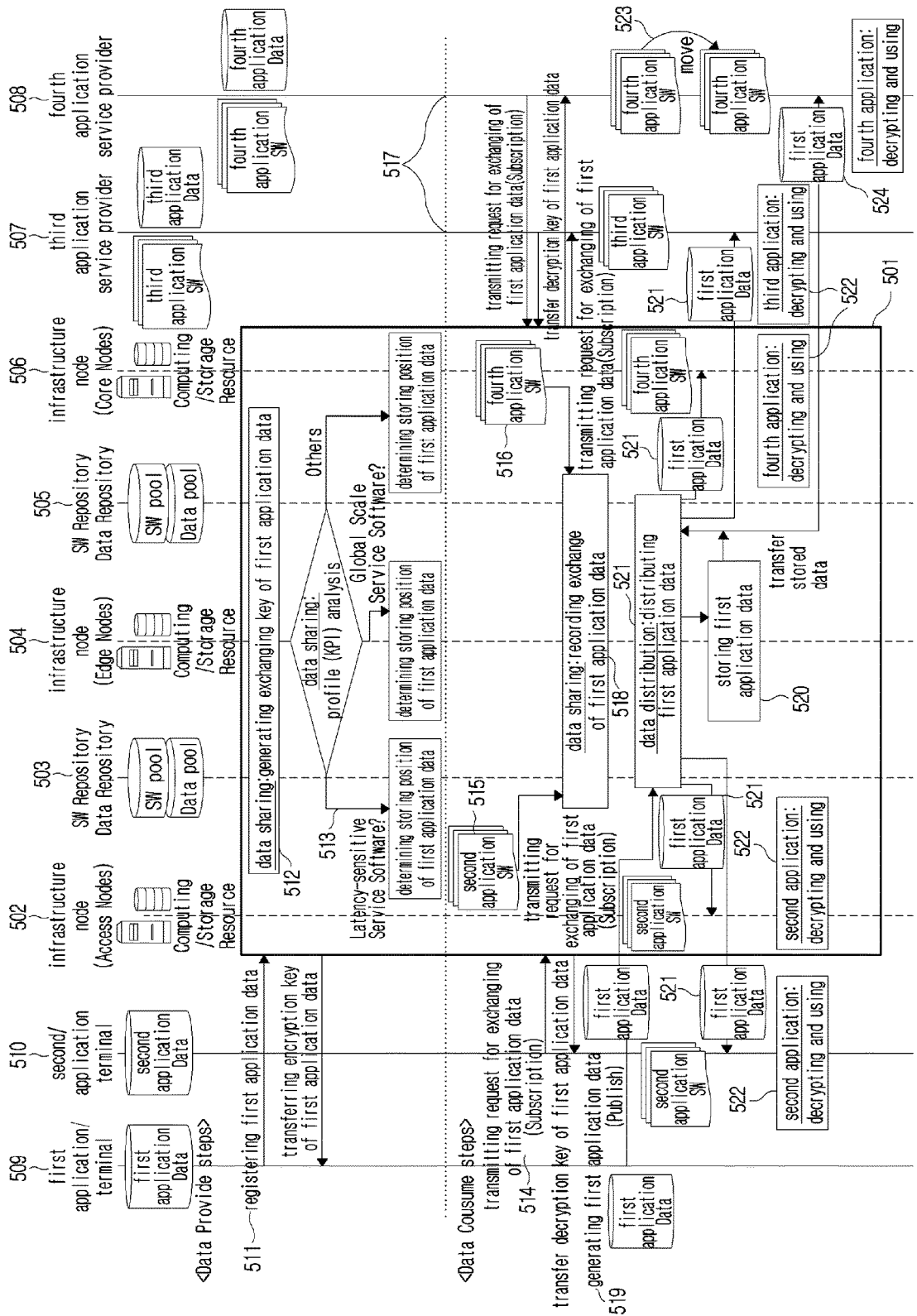
FIG. 7 is a view showing a processing process within a network infrastructure of event-driven asynchronous data sharing and exchanging for N data providers to M data consumers among application domains in a network infrastructure according to the present invention.

FIG. 7 is a view showing a processing process within a network infrastructure of event-driven asynchronous data sharing and exchanging for N data providers to M data consumers among application domains in a network infrastructure 501 according to the present invention.

In the data sharing and service processing infrastructure 501, an access network node 502, an edge network node 504, and a core network node 506 are present, and each of the network nodes includes, in addition to network resources and function, computing and storage resources and processing functions. In addition, repositories 503 and 505 storing application data and application software may be distributed and positioned in the network nodes or cloud nodes to be uniformly accessed within the network infrastructure. A data sharing and exchanging process of FIG. 7 is, for example, an N-to-M asynchronous data sharing and exchanging process where data sharing is performed in an event-driven manner without a request for data generated in real-time in the first application from services of a second application, a third application, and a fourth application.

In detail, in 511, an application server or terminal 509 of the first application domain registers data to be published by providing to the data sharing function 208 described above of the network infrastructure a name of the data to be shared and a profile representing a feature of the data.

In 512, the data sharing function 208 described above of the network infrastructure determines a position of corresponding data to be stored by analyzing the profile received from the provider of the corresponding data. In other words, in 513, the position may be determined in consideration of a feature of each profile. For example, service data that is sensitive in latency may be stored close to an access network node, data that is valued in a specific region may be stored in the corresponding region, data that will be used in nation-wide may be stored in the entire access network node or core network node, or a large amount of data or data processed in non real-time may be stored in a central cloud node. Herein, when the data is shared in an encrypted state, an encryption key may be provided to the provider of the first application data.

When a request for a subscription for the data of the first application which is registered to be published is received from a terminal 510 of the second application domain, a server 507 of the third application domain, and a server 508 of the fourth application domain or a software 515 of the second application domain and a software 516 of the fourth application domain which are being executed in the network infrastructure (subscription process), in 518, the data sharing function 208 described above of the network infrastructure manages a list of the second application, third application, fourth application which have transmitted the request for the subscription. In addition, when the data is shared in an encrypted state, a decryption key for the data of the first application data may be respectively transferred.

Then, when data published and registered from the first application terminal 509 is generated in 519, in 520, the data distribution function 205 described above of the network infrastructure and which has received the data stores the corresponding data. In addition, in 521, the data distribution function 205 transfers the received data to the second application terminal 510, the third application server 507, and the fourth application server 508 which have transmitted the request for the subscription of the corresponding data and which are outside of the infrastructure, and to the second application software 515 and the fourth application software 516 which are being executed within the network infrastructure. In 522, the applications having been received the data of which subscription of the same is transmitted decrypt and use the received data by using the transferred decryption key when the received data is encrypted.

Herein, in 523, when the requested data for the subscription is not transmitted due to movement of, for example, the fourth application that is outside of the network infrastructure, in 514, after the fourth application completes the movement, the data distribution function 205 described above of the network infrastructure transfers the data to the fourth application that has completed the movement by using the stored data when the movement position of the fourth application is detected to be with the network infrastructure such that the fourth application uses the data.

FIGS. 8 to 11 are views showing an embodiment of a traffic application service using a data sharing network infrastructure system according to the present invention as an example.

Figure 8:
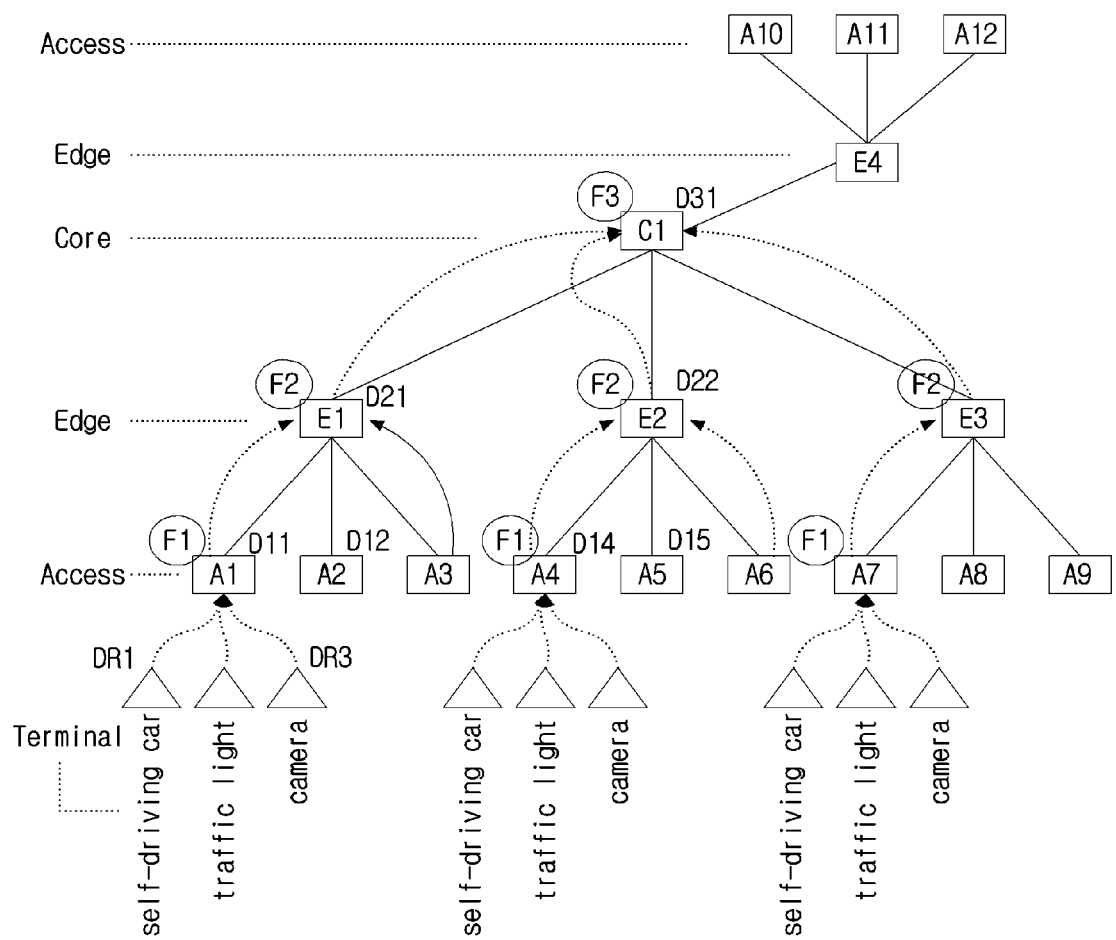
FIGS. 8 to 11 are views showing an example using a network infrastructure system according to the present invention, and show an example of a traffic application system.

FIG. 8 is a view showing an embodiment of the present invention in terms of efficiency of a big data processing service for a traffic service. For example, in the network infrastructure system, as a network node, access nodes A1, A2, A3, . . . , A9, A10, A11, and A12, edge nodes E1, E2, E3, and E4), and a core node C1 are hierarchically established in a nation-wide, and as described above, and each network node includes, in addition to network connectivity, computing and storage resources, and includes functions of storing application data and executing application software.

Related to the same, in the embodiment of FIG. 8, an application service under the traffic environment is used as an example, a terminal may be a "self-driving car", a "traffic light", a "camera", etc. For example, one access node may correspond to an intersection of one region, and one edge node may correspond to a regional traffic range including various intersections.

Data (data raw, DR1, DR2, DR3) in a terminal unit which is generated in the terminal (for example, self-driving car, traffic light, camera) is collected by intersection traffic information collecting and analysis application software F1 of the access node A1, and is generated and stored as intersection unit traffic processing information D11. The intersection unit traffic processing information D11 is collected by regional traffic information collecting and analysis software F2 of the edge node E1, and is generated and stored as regional unit traffic processing information D21. In addition, regional unit traffic processing information D21 is collected by nation-wide traffic information collecting and analysis application software F3 of the core node C1, and is generated and stored as nation-wide traffic processing information D31. As described above, when transferring data generated by the terminal through hierarchical nodes within the network infrastructure, big data is hierarchically collected and immediately analyzed, and thus a structure where real-time analysis and control is available is provided. In addition, application software such as processing the big data may be dynamically downloaded at an optimized execution position in an on-demand manner according to request of the application server and the application terminal.

Related to the same, application software is executed by being distributed and provided to each of the network nodes A1, . . . A12, E1, . . . , E4, and C1 which are configured in a hierarchical architecture according to an embodiment of FIG. 8, and thus more requirements of various applications (network bandwidth, computing resource, mobility, data proximity, etc.) may be processed than conventional low latency oriented requirement solutions provided from a fog computing system using an access network node adjacent to a terminal position as a target. Accordingly, the system may be advanced with comprehensiveness and efficiency. In addition, application software is immediately and dynamically searched and downloaded in on-line according to a request of the application terminal or server so that the application software is dynamically executed without an intervention of an operator, and thus the system may be more advanced than a conventional fog or edge cloud system.

Figure 9:
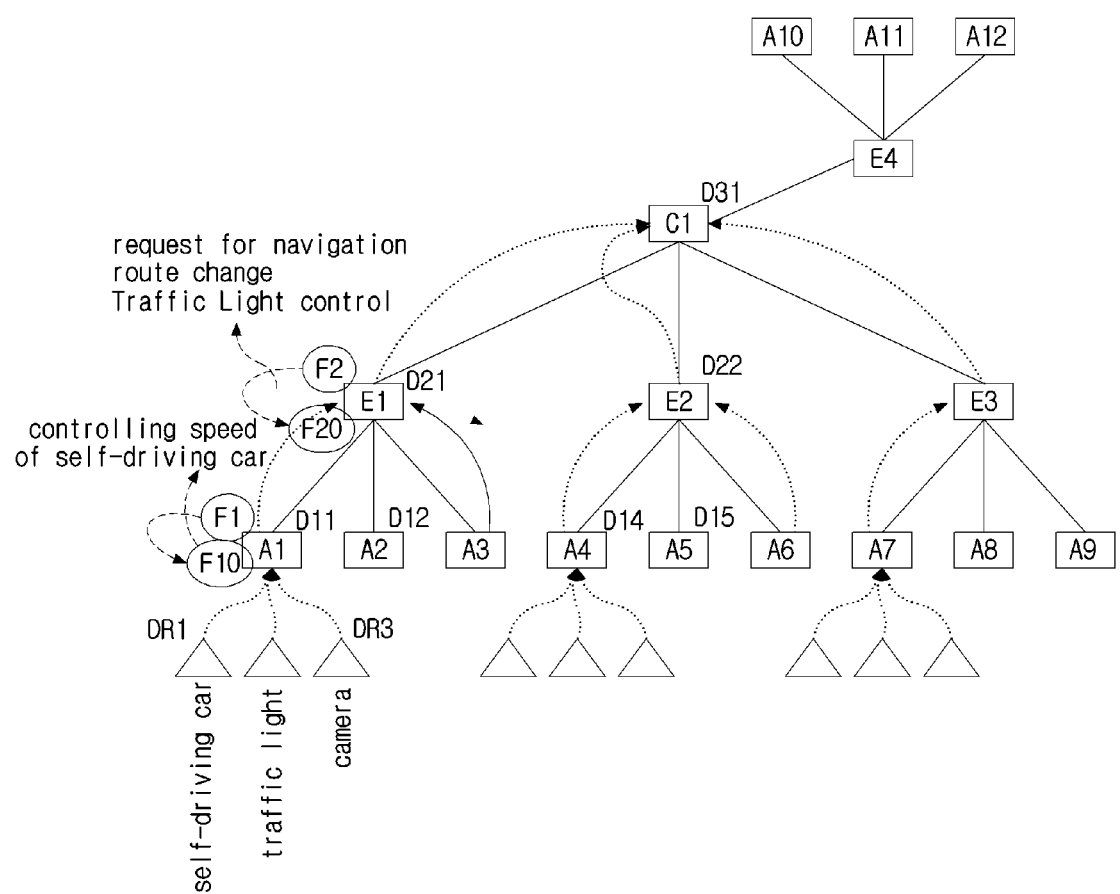

FIG. 9 is a view showing an example where a fast control for a traffic service is implemented in terms of efficiency by applying an embodiment of FIG. 8 described above.

For example, when application software F1 of the access node A1 collecting and analyzing intersection traffic information detects an accident occurring in the intersection, the access node A1 immediately transfers corresponding data D11 to application software F10 controlling an intersection self-driving car speed. Thus, urgent services may be processed with the minimum low latency as real-time services such as speed controlling or stopping of following up self-driving cars due to traffic accident.

In addition, the edge node E1 immediately transfers regional traffic data D21 collected by application software F2 of the edge node E1 which collects intersection accident occurrence information to application software F20 controlling a regional traffic, and thus, in order to control the traffic within the region according to stagnation after the traffic accident, signal controlling at a neighborhood intersection may be performed, or changing navigation information of nearby self-driving car may be performed to make traffic flow smooth.

Figure 10:
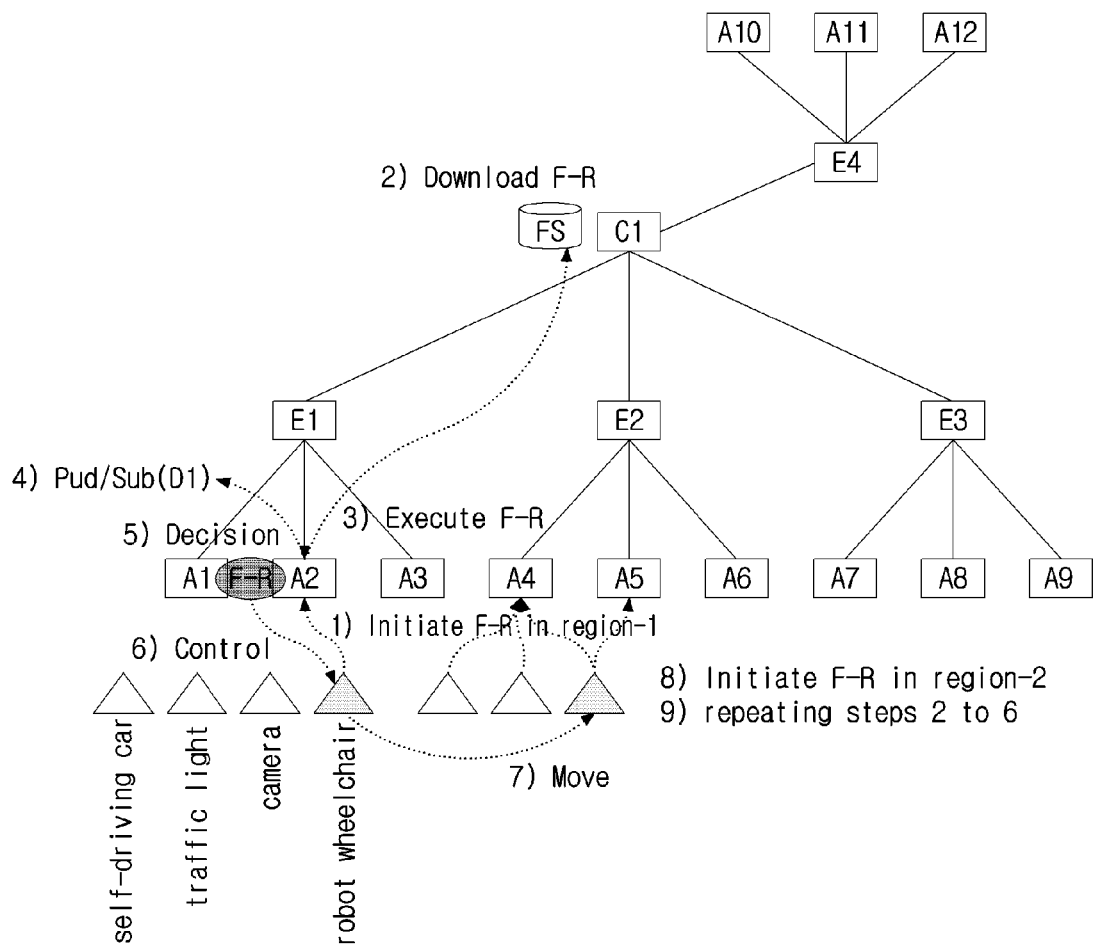

FIG. 10 is a view showing an example where a welfare service is efficiently implemented in a dynamic and on-demand manner under a traffic service environment by applying an embodiment of FIG. 8 described above.

For example, it is assumed that an older person who is inconvenient in behavior comes out to a town on a robot wheelchair in the traffic service environment of FIG. 10. In addition, it may be assumed that the corresponding robot wheelchair is a self-driving wheelchair without including self-driving software or an expensive sensor such as camera. When the robot wheelchair is in the town, in step 1, the robot wheelchair transmits a request for executing robot self-driving application software F-R for itself to a connected access node A2. In step 2, the access node A2 searches for the requested application software F-R from the software repository FS within the network infrastructure, and dynamically downloads the same to the access A2 node. In step 3, the access node A2 executes the corresponding downloaded software. For example, the application software F-R performs a process of sharing information (step 4, data subscription) for obtaining traffic (traffic light, camera, self-driving car) information D1 of the intersection from access node A2 which is required for self-driving of the robot wheelchair. In step 5, the application software F-R that has received traffic information D1 of the region A2 determines a route for self-driving of the robot wheelchair. In step 6, the robot wheelchair is controlled in real-time by the closest access node A2. Herein, in step 7, when the robot wheelchair moves to a neighbor region (access node A5), in step 8, the robot wheelchair performs the steps performed in the access node A2 in the access node A5. Then, the network infrastructure shares necessary data and the welfare application service of the self-driving robot wheelchair at an optimized position within the network infrastructure by repeating the steps 2 to 6. Thus, self-driving service to the destination is provided to the robot wheelchair.

Figure 11:
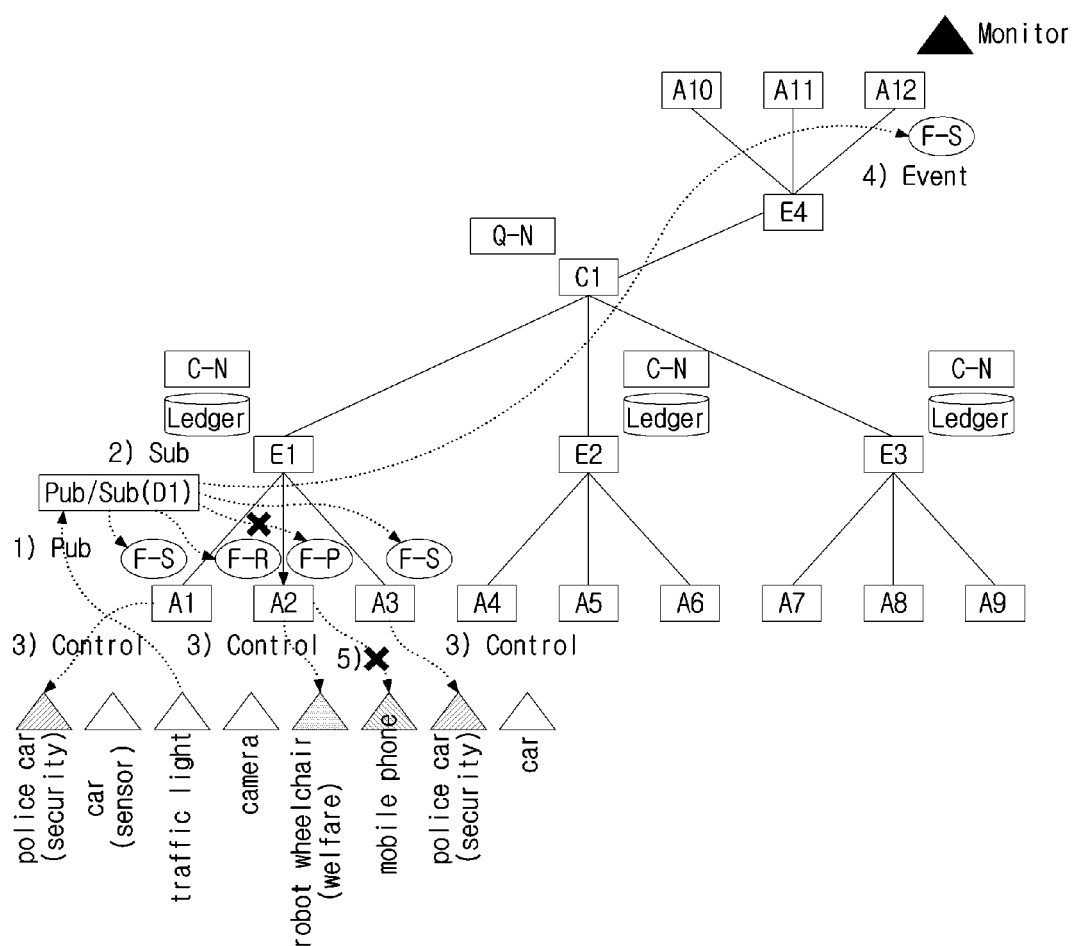

FIG. 11 is a view showing an example of a process of implementing a market place where sharing or exchanging between traffic, welfare, security application domains is implemented by applying an embodiment of FIG. 8 described above.

For example, a case is shown where self-driving car speed control traffic application software F10, robot wheelchair self-driving welfare application software F-R, and criminal arrest safety application software F-S share or exchange or both traffic data D1 that is collected, stored, and processed in access node A2 of FIG. 11. By using a process of data sharing or exchanging, the security and welfare application domains receive a key capable of decoding data D1 so as to use traffic data D1. Welfare and security application services (F-R and F-S) transmit a request for the data D1 to the data sharing function 208 described above within the network infrastructure (step 2, subscription). Then, in step 1, when data is generated from a traffic light or camera. In step 3, the corresponding data is transferred to application software F-S and F-R which have transmitted the request for subscription, and the application software F-S and F-R which have received the data decrypts the data by using a valid key and control the terminal (for example, calling a police car, moving the robot wheelchair). In addition, in step 4, the shared or exchanged data is identically transferred along a network path to a neighbor application terminal and a remote terminal when a request for subscription of the same is transmitted. In addition, in step 5, for the application software F-P to which data sharing or exchanging is not approved, although data is transferred to the same by the subscription, the data is not shared since the valid key is not transmitted thereto. Thus, normal data sharing or exchanging, and a market place function may be provided.

Related to the same, each block constituting the system is shown in an individual block, but may be implemented in one medium where a software program is included. The program medium may include a ROM memory.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A network infrastructure system for sharing and processing data by using a network infrastructure to which application domains being each composed of an application terminal or an application server are connected in a shared manner, the network infrastructure system comprising:

at least one processor; and a memory having instructions stored thereon, which, when executed by the at least one processor, cause the at least one processor to implement:

a plurality of network infrastructure nodes storing, processing, and sharing data within the network infrastructure system, wherein each of the plurality of network infrastructure nodes corresponds to one of an access network node, an edge network node, and a core network node, which constitute the network infrastructure system, wherein the access network node is configured to provide an interface enabling an end user to connect to the network infrastructure system, the edge network node is configured to concentrate the access network nodes, and the core network node is configured to perform connection between the edge network nodes, wherein each of the access network node, the edge network node and the core network node includes a data processing module including a data transfer function, a data distribution function, a data processing function, and a data sharing function, which are provided to at least one of the application terminal and the application server, wherein each of the plurality of network infrastructure nodes further includes an optimization engine function: optimizing a network connection, a data storage position, a software execution position so as to satisfy application service requirement (KPI); determining an initial position of application data and application software based on a profile of the application data and application software; and performing optimization for the storage position and the execution position based on an access frequency of the application data, a network transmission amount, and statistical and record information of execution quality of the application software.

2. The network infrastructure system of claim 1, wherein each network infrastructure node further includes an application data repository and an application software repository.

3. The network infrastructure system of claim 1, wherein the data transfer function is an interface through which all application terminals or application servers within the application domains are connected to the network infrastructure, and transfers data between the application terminals or the application servers in the application domains or application software executed in the network infrastructure nodes based on a name of application data and application software in a request/response manner.

4. The network infrastructure system of claim 3, wherein the data transfer function transfers data by performing synchronization based on a name of the data in a one-to-one request/response manner.

5. The network infrastructure system of claim 1, wherein when application data is asynchronously transferred in an event-driven manner between N data generators and M data consumers, the N data generators that want to share data publish the data based on a name of the data in the network infrastructure by using the data distribution function, and the M data consumers that want to consume data transmit a subscription request for desired data in the network infrastructure based on a name of the data by using the data distribution function.

6. The network infrastructure system of claim 5, wherein the data distribution function stores and manages a list of receivers that will receive the shared data and criterion information by receiving the published data and the subscription request, and distributes the shared data to the M data consumers that has transmitted the subscription request in an event-driven manner without receiving an additional request by using the receiver list and the criterion information when the data is published.

7. The network infrastructure system of claim 1, wherein the data distribution function dynamically determines a storage position and a distribution position of data to be distributed according to a temporal sharing feature and a spatial sharing feature of the data, and a distribution situation of a data generator and a data consumer, and adjusts the storage position and the distribution position of the data according to changes in position of the data generator and the data consumer.

8. The network infrastructure system of claim 1, wherein the data distribution function publishes, in addition to raw data generated in the application terminal or application server of all the application domains connected to the network infrastructure, processed data that is regenerated by application software executed in the network infrastructure node within the network infrastructure, and wherein the application software executed in the network infrastructure node within the network infrastructure receives arbitrary data as a data consumer by transmitting a subscription request for the arbitrary data.

9. The network infrastructure system of claim 1, wherein the data processing function: receives a service request based on a name of application data and application software information from the application terminal or application server; determines an optimized execution position of the application software; dynamically downloads the application data and the application software required for processing the service; and executes the downloaded application software.

10. The network infrastructure system of claim 9, wherein the application data designated base on the name is transferred from the application terminal or application server according to the service request, or stored in an arbitrary repository within the network infrastructure, and the application software designated base on the name is stored in an arbitrary repository within the network infrastructure in advance by an application, executed by being dynamically downloaded in the optimized execution position within the network infrastructure by the data processing function when an execution of the application software is received, and transfers a result of the execution to the application terminal or application server which has transmitted the execution request.

11. The network infrastructure system of claim 10, wherein the optimized execution position of the application software is determined according to a feature of the corresponding application software, wherein as the optimized execution position, a network node positioned closest to data to be processed is determined when an amount of the data to be processed is large, a network node positioned close to a position of the application terminal is determined when a fast processing response to the application terminal is required, a network node possessing a computing resource capable of satisfying a corresponding request is determined when an large amount of the computing resource is required, and a network node using the best optimized network is determined when data to be processed is distributed into various positions.

12. The network infrastructure system of claim 9, wherein the data processing function: determines the execution position of the application software that the execution request for the application software has been transmitted from the application terminal or application server based on a name of the application software; downloads the application data from the application domain or from a network internal storage position when the name of the application data designated from the corresponding application terminal or application server has been transmitted together, and executes the application software by binding the application data; and transfers a result of the execution to the application terminal or application server.

13. The network infrastructure system of claim 1, wherein each of the plurality of network infrastructure nodes further includes an infrastructure resource management function, wherein the infrastructure resource management function: integrally manages a computing resource, a storage resource, and a network resource of the plurality of network infrastructure nodes distributed within the network infrastructure system; stores application data within the network infrastructure system without a command or control of an operator by distributing the application data by performing auto-scaling of increase, decrease, and error in the resource; and provides an computing environment where the application software is executed.

14. The network infrastructure system of claim 1, wherein each of the plurality of network infrastructure nodes further includes a data security function, wherein the data security function manages and provides an encryption key for data sharing between the application domains connected through the network infrastructure, and for data exchanging between an approved data generator and a data consumer.

15. The network infrastructure system of claim 14, wherein the data sharing function stores and manages, for integrity verification, an exchanging record of data exchange between the approved data generator and the consumer.

16. The network infrastructure system of claim 1, wherein each of the plurality of network infrastructure nodes further includes an optimization engine function performing optimization by performing learning using the data distribution function between a data generator and a data consumer according to changes in number and in position of N data generators and M data consumers.

17. The network infrastructure system of claim 1, further comprising a cloud node as a network infrastructure node constituting the network infrastructure system, wherein the cloud node includes an application data repository and an application software repository.

18. A plurality of network infrastructure nodes for processing data by using a network infrastructure to which application domains being each composed of an application terminal or an application server are connected in a shared manner in a network infrastructure system, each of the plurality of network infrastructure nodes comprising:
   at least one processor; and a memory having instructions stored thereon, which, when executed by the at least one processor, cause the at least one processor to implement:
   a data processing module storing, processing, and sharing data provided to the network infrastructure system,
   wherein each of the plurality of network infrastructure nodes corresponds to one of an access network node, an edge network node, and a core network node, which constitute the network infrastructure system, wherein the access network node is configured to provide an interface enabling an end user to connect to the network infrastructure system, the edge network node is configured to concentrate the access network nodes, and the core network node is configured to perform connection between the edge network nodes,
   wherein each of the access network node, the edge network node and the core network node provides a data transfer function, a data distribution function, a data processing function, and a data sharing function to at least one of the application terminal and the application server,
   wherein each of the plurality of network infrastructure nodes further includes an optimization engine function: optimizing a network connection, a data storage position, a software execution position so as to satisfy application service requirement (KPI); determining an initial position of application data and application software based on a profile of the application data and application software; and performing optimization for the storage position and the execution position based on an access frequency of the application data, a network transmission amount, and statistical and record information of execution quality of the application software.

* * * * *